(12) United States Patent
Akasaka (10) Patent No.: US 7,052,078 B2
(45) Date of Patent: May 30, 2006

(54) TAILORED BLANK ARTICLE WITH LEAD-IN OPENING STRUCTURE

(75) Inventor: Kosuke Akasaka, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 14 days.

(21) Appl. No.: 10/956,762

(22) Filed: Oct. 1, 2004

(65) Prior Publication Data

US 2005/0076604 A1    Apr. 14, 2005

(30) Foreign Application Priority Data

Oct. 8, 2003    (JP)    ............... 2003-349277

(51) Int. Cl.
*B60R 13/04* (2006.01)

(52) U.S. Cl. ...................... 296/191; 296/192
(58) Field of Classification Search ................ 296/191, 296/192
See application file for complete search history.

(56) References Cited

U.S. PATENT DOCUMENTS

| 3,774,802 | A | * | 11/1973 | O'Cheskey | ............... 220/694 |
| 4,465,205 | A | * | 8/1984 | Sutch | ............... 220/276 |
| 6,060,682 | A | * | 5/2000 | Westbroek et al. | .... 219/121.64 |
| 6,585,147 | B1 | * | 7/2003 | Jogan | ............... 228/112.1 |
| 6,739,647 | B1 | * | 5/2004 | Obara et al. | ............... 296/191 |
| 6,860,547 | B1 | * | 3/2005 | Winter et al. | ............... 296/193.02 |
| 6,893,065 | B1 | * | 5/2005 | Seksaria et al. | ............... 296/192 |
| 6,929,308 | B1 | * | 8/2005 | Komatsu et al. | ............... 296/146.5 |
| 2003/0205916 | A1 | * | 11/2003 | Seksaria et al. | ............... 296/192 |
| 2004/0074949 | A1 | * | 4/2004 | Narita et al. | ............... 228/112.1 |
| 2005/0011864 | A1 | * | 1/2005 | Miyamoto et al. | ............... 219/83 |

FOREIGN PATENT DOCUMENTS

| JP | 2001122154 | A | * | 5/2001 |
| JP | 2003-019979 | | | 1/2003 |
| JP | 2004050187 | A | * | 2/2004 |

* cited by examiner

*Primary Examiner*—Kiran B. Patel
(74) *Attorney, Agent, or Firm*—Hamre, Schumann, Mueller & Larson, P.C.

(57) ABSTRACT

A tailored blank article having a lead-in opening structure, which is free from water leakage even through a lead-in opening is located at a step formed on one surface of the tailored blank article consisting of two metal plates with different thicknesses butt-welded together. The lead-in opening structure includes a recessed portion formed in the stepped surface of the tailored blank article along a peripheral edge of the opening, a sealing material filled in the recessed portion to undergo leveling of the peripheral edge of the opening including the step, and a seal plate covering the sealing material and attached to the tailored blank article.

3 Claims, 9 Drawing Sheets

TAILORED BLANK ARTICLE WITH LEAD-IN OPENING STRUCTURE

FIELD OF THE INVENTION

The present invention relates generally to a vehicle body part or article formed from a tailor-welded blank (also called "tailored blank") consisting of two metal plates with different thicknesses butt-welded together to form a stepped portion or step along a butt-joint therebetween, and more particularly to such a tailored blank article having an opening extending over the two metal plates across the step for the passage therethrough of a cup-shaped lead-in member attached to the tailored blank article.

BACKGROUND OF THE INVENTION

In the manufacture of an automobile body, plural pieces of steel plate are welded together to form a blank that is well tailored for a subsequent processing operation, such as press-forming. The blank is generally called "tailor-welded blank" or "tailored blank". By using the tailored blank process, it is possible to weld together a variety of materials of different thickness, tensile strength and so on.

Figure 9A:
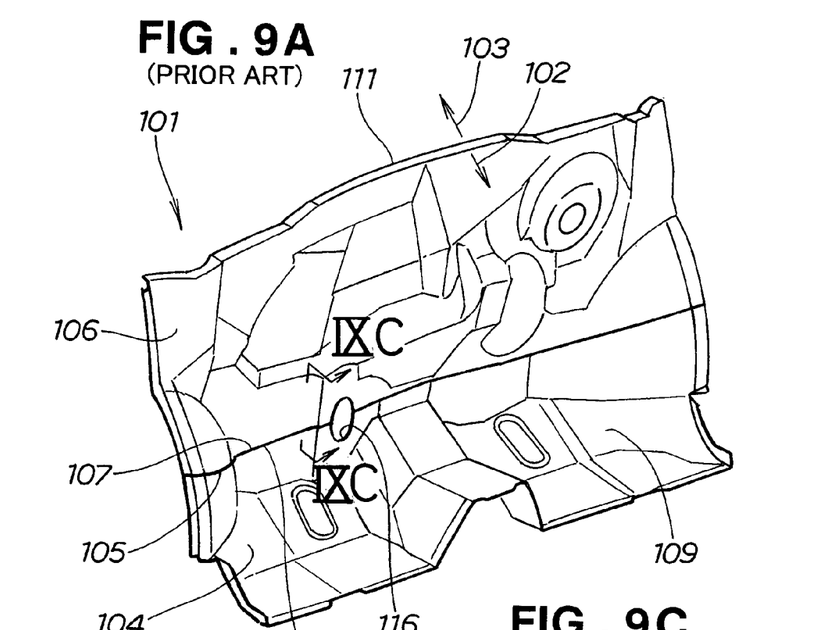
FIG. 9A is perspective view showing a conventional dashboard lower panel formed from a tailored blank and having a lead-in opening located at a weld joint between two metal plates with different thicknesses.

In one application shown in Japanese Patent Laid-open Publication (JP-A) No. 2003-19979, a tailored blank is used to form a dashboard lower panel of a vehicle body structure. The dashboard lower panel 101, as shown in FIG. 9A hereof, is a partition wall separating a passenger room 102 and an engine room 103. The dashboard lower panel 101 is formed from a tailored blank consisting of a thick metal plate 104 and a thin metal plate 106 joined at one end 105, 107 by mash-seam welding. The dashboard lower panel (i.e., tailored blank article) 101 has an opening 116 formed therein for introducing a vehicle part from the engine room side into the passenger room side. The opening 116 extends over the thick and thin metal plates 104, 106 across a welded portion 108.

Figure 9B:
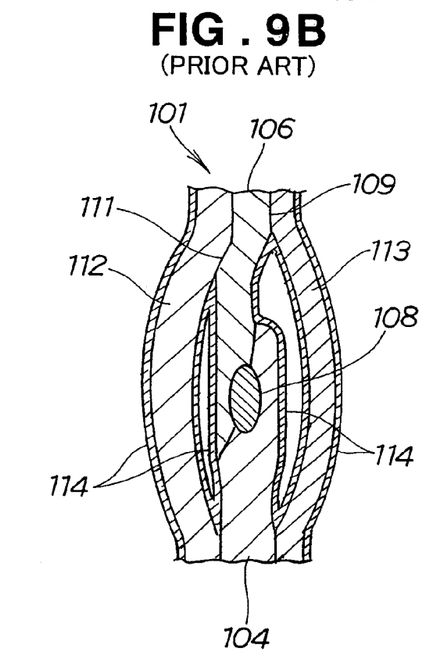
FIG. 9B is a cross-sectional view of the conventional dashboard lower panel.

As shown in FIG. 9B, the dashboard lower panel 101 has an outer surface 103 facing the engine room 103 (FIG. 9A), and an end flange 112 of a front side frame is attached to the outer surface 103. Similarly, an insulator panel 113 is attached to an inner surface 109 of the dashboard lower panel 101. The inner and outer surfaces 109, 111 of the dashboard lower panel 101 are coated with paint film layers 114, 114.

Figure 9C:
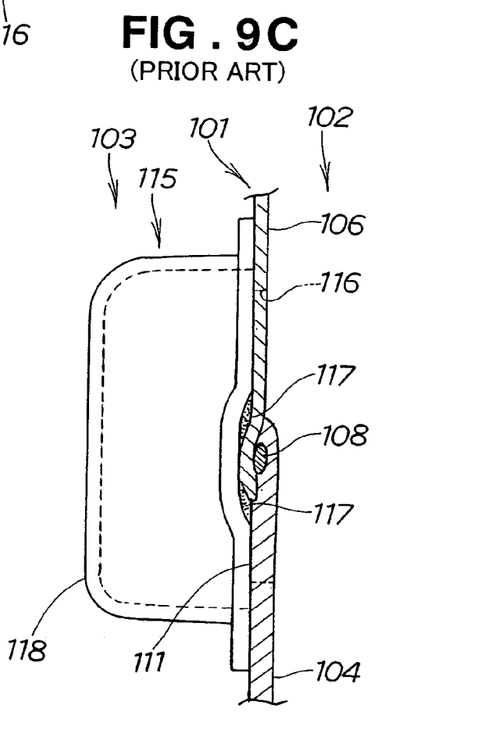
FIG. 9C is a cross-sectional view taken along line IXC—IXC of FIG. 9A.

FIG. 9C is a cross-sectional view taken along line IXC—IXC of FIG. 9A. As shown in this figure, a cup-shaped lead-in member 118 is attached to the outer surface 111 of the dashboard lower panel 101 with a seal 117 disposed therebetween so as to cover the opening 116 from the engine room side. The cup-shaped lead-in member 118 and the opening 116 together form an opening structure 115.

The dashboard lower panel 101 having such opening structure 115 has a problem that when the engine room 103 is washed by means of water, water may leak into the passenger room side from a mating surface between the seal 117 and a step formed along the welded portion 108 of the dashboard lower panel 101.

SUMMARY OF THE INVENTION

It is, therefore, an object of the present invention to provide a tailored blank article having a lead-in opening structure, which is free from water leakage even through a lead-in opening is located at a step formed along a butt-joint between two metal plates with different thicknesses of the tailored blank article.

To achieve the foregoing object, there is provided according to the present invention a tailored blank article comprising two metal plates with different thicknesses butt-welded together to form a step on one surface of the tailored blank article along a butt-joint between the two metal plates, and a lead-in opening structure for introducing a lead-in element from one side to the other side of the tailored blank article. The lead-in opening structure includes an opening formed in the tailored blank article so as to extend over the two metal plates across the step, a recessed portion formed in the one surface of the tailored blank article along a peripheral edge of the opening, a sealing material filled in the recessed portion to undergo leveling of the peripheral edge of the opening including the step, and a seal plate of a configuration generally corresponding in contour to the shape of the opening, the seal plate covering the sealing material and being attached to the two metal plates.

Since the peripheral edge of the opening including the step is leveled by the sealing material filled in the recessed portion formed in the stepped surface of the tailored blank article along the peripheral edge of the opening, it is possible to attach the seal plate to the tailored blank article with increased stability. Furthermore, the sealing material disposed between the recessed portion of the dashboard and the seal plate makes the lead-in opening structure watertight. By thus providing the watertight lead-in opening structure, leakage of water or other liquid from the engine room side to the passenger compartment side does never occur during washing of the engine room.

Preferably, the seal plate has a tubular lip fitted with the peripheral edge of the opening, and a flat seat portion integral with the tubular lip and forming an end flange of the tubular lip, the flat seat portion extending over the sealing material and being attached to the two metal plates. By thus forming the seal plate, it is possible to stably hold the sealing material within the recessed portion.

The tailored blank article may further comprise a seal ring and a generally cup-shaped lead-in member having an end flange at an open end thereof. The cup-shaped lead-in member is assembled with the lead-in opening structure with the seal ring disposed between the flat seat portion of the seal plate and the end flange of the cup-shaped lead-in member.

The flat seat portion of the seal plate facilitates easy and stable assembly of the cup-shaped lead-in member and the lead-in opening structure with the seal ring held between the flat seat portion and an end flange of the cup-shaped lead-in member. The seal ring improves the water-tightness of a lead-in port assembly formed jointly by the lead-in opening structure and the cup-shaped lead-in member.

BRIEF DESCRIPTION OF THE DRAWINGS

A preferred structural embodiment of the present invention will be described in detail herein below, by way of example only, with the reference to the accompanying drawings, in which.

DETAILED DESCRIPTION OF THE PREFERRED EMBODIMENT

Figure 1:
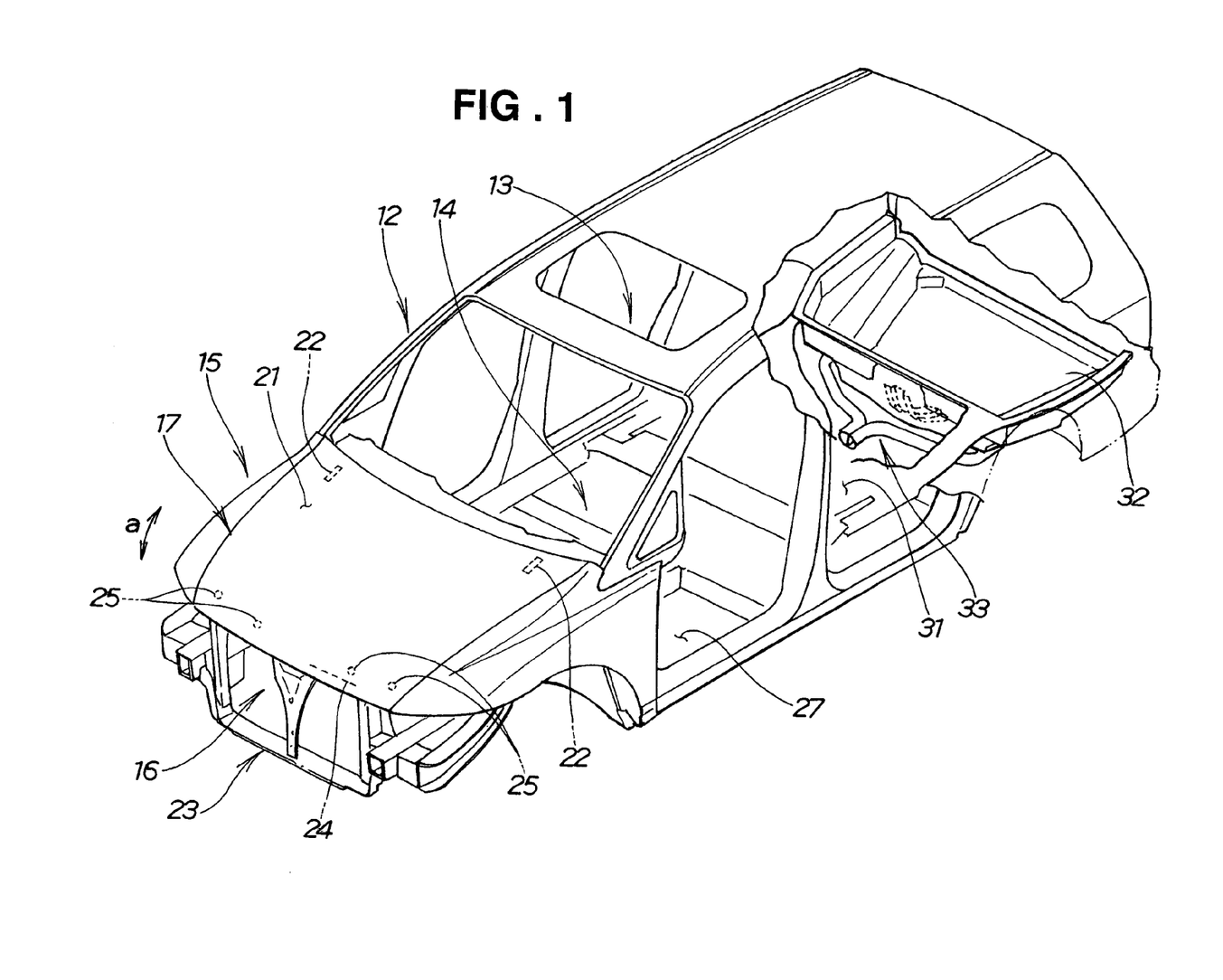
FIG. 1 is a perspective view, with parts cut-away for clarity, of an vehicle body in which a tailored blank article having a lead-in opening structure according to the present invention is incorporated.

Referring now to the drawings and FIG. 1 in particular, there is shown a vehicle body in which a tailored blank article having a lead-in opening structure according to the present invention is incorporated.

The vehicle body 12 includes an under body 14 forming a floor of a passenger compartment 13, and a front body 15 contiguous with and extending forwardly from a front end of the under body 14. The front body 15 has an engine room 16 and a hood structure or assembly 17.

The hood assembly 17 includes a hood panel 21 pivotally connected at a rear end thereof to vehicle body via a pair of hood hinges 22, 22 to undergo vertical pivotal movement about the hood hinges 22, 22 for opening and closing the engine room 16. The hood assembly 17 also includes a plurality of hood cushions 25 provided on an upper frame 24 of a bulkhead 23 for engagement with a front end of the hood panel 21 so as to absorb in impact force when the hood panel 21 is closed.

The under body 14 includes a front floor 27 and a rear floor 31 contiguous with and extending rearward from a rear end of the front floor 27. The rear floor 27 has a spare tire accommodation space 32. Numeral 33 shown in FIG. 1 denotes an exhaust system disposed below the rear floor 31.

Figure 2:
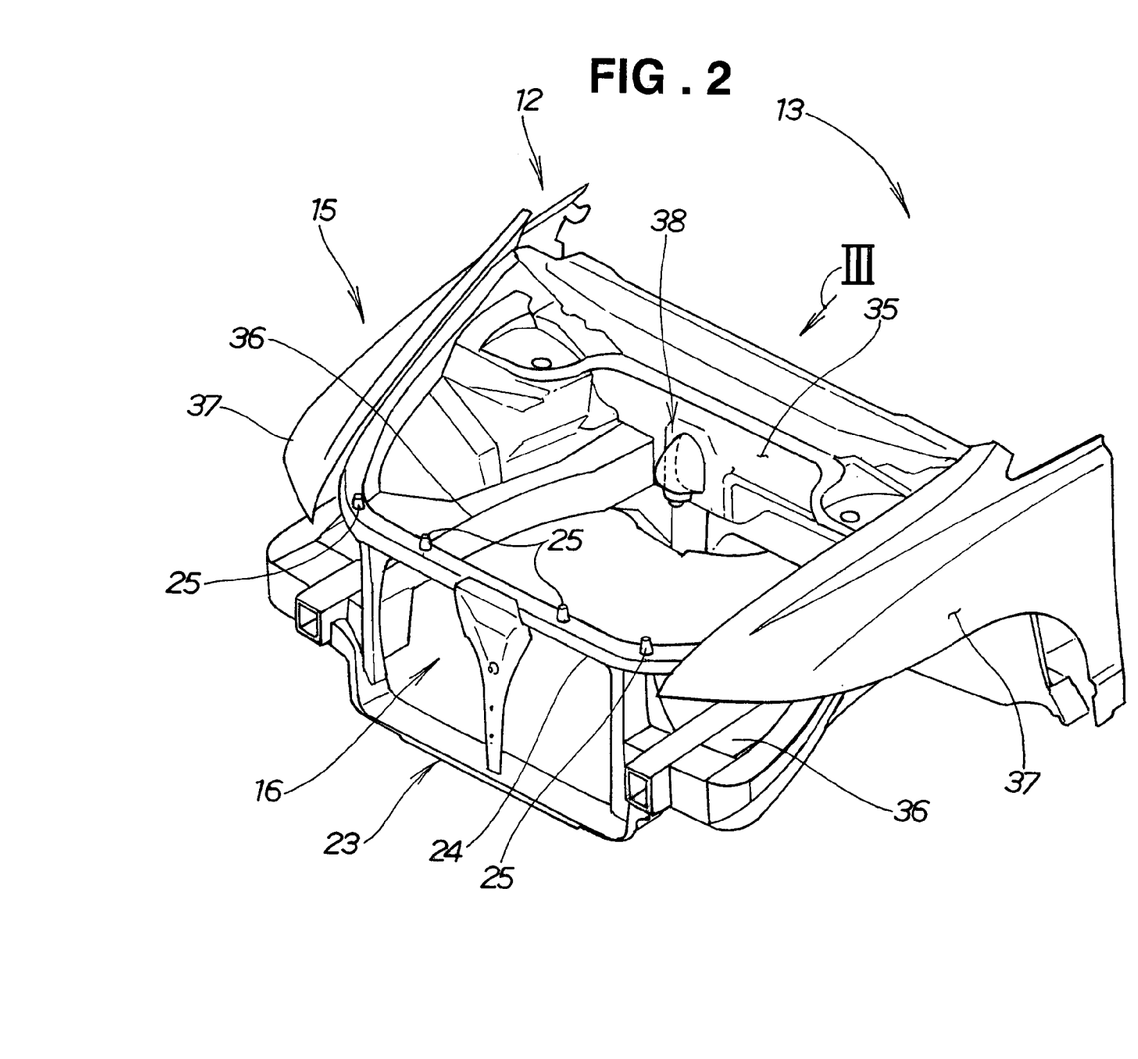
FIG. 2 is a perspective view of a front body incorporating therein the lead-in opening structure.

As shown in FIG. 2, the front body 15 includes a dashboard 35 disposed between the engine room 16 and the passenger compartment 13, a pair of front side frames 36, 36 connected at rear ends to the dashboard 35, the bulkhead 23 connected at front ends of the front side frames 36, 36, and front fenders 37, 37 connected to the respective side frames for covering upper portions of left and right front wheels (not shown). The dashboard 35 is equipped with a lead-in part assembly 38.

Figure 3:
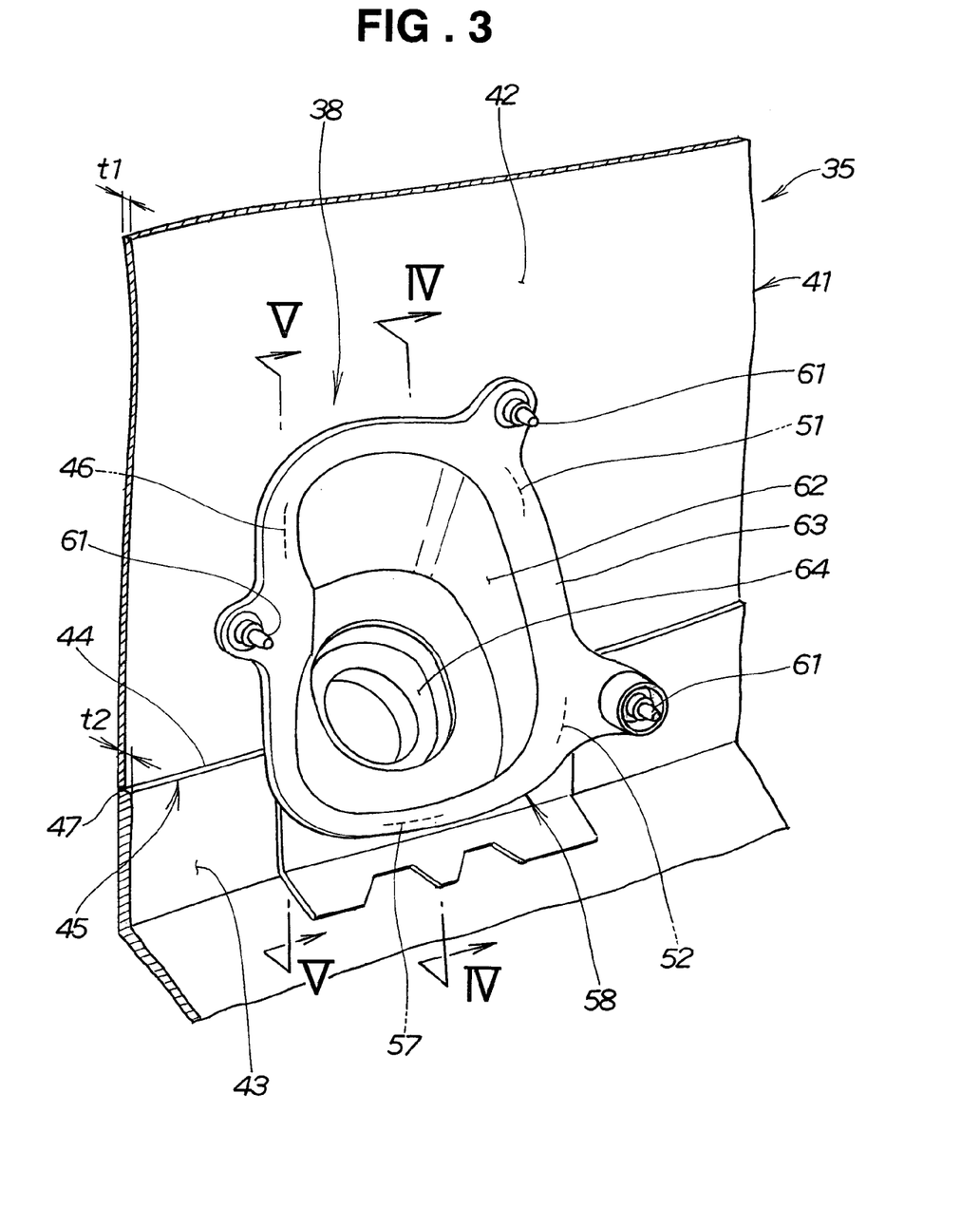
FIG. 3 is a perspective view in a direction of the arrow III shown in FIG. 2.
Figure 4:
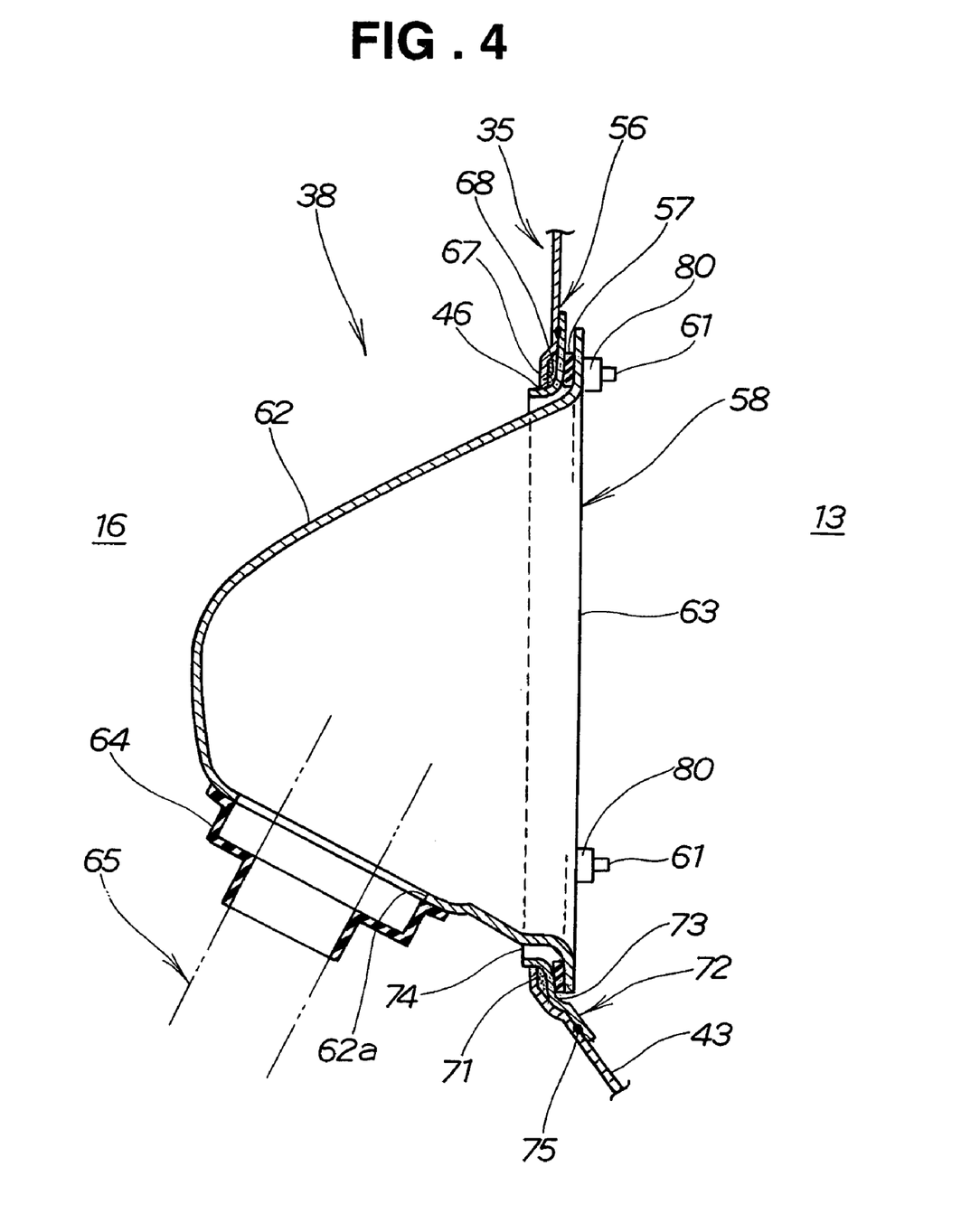
FIG. 4 is a cross-sectional view taken along line IV—IV of FIG. 3.
Figure 5:
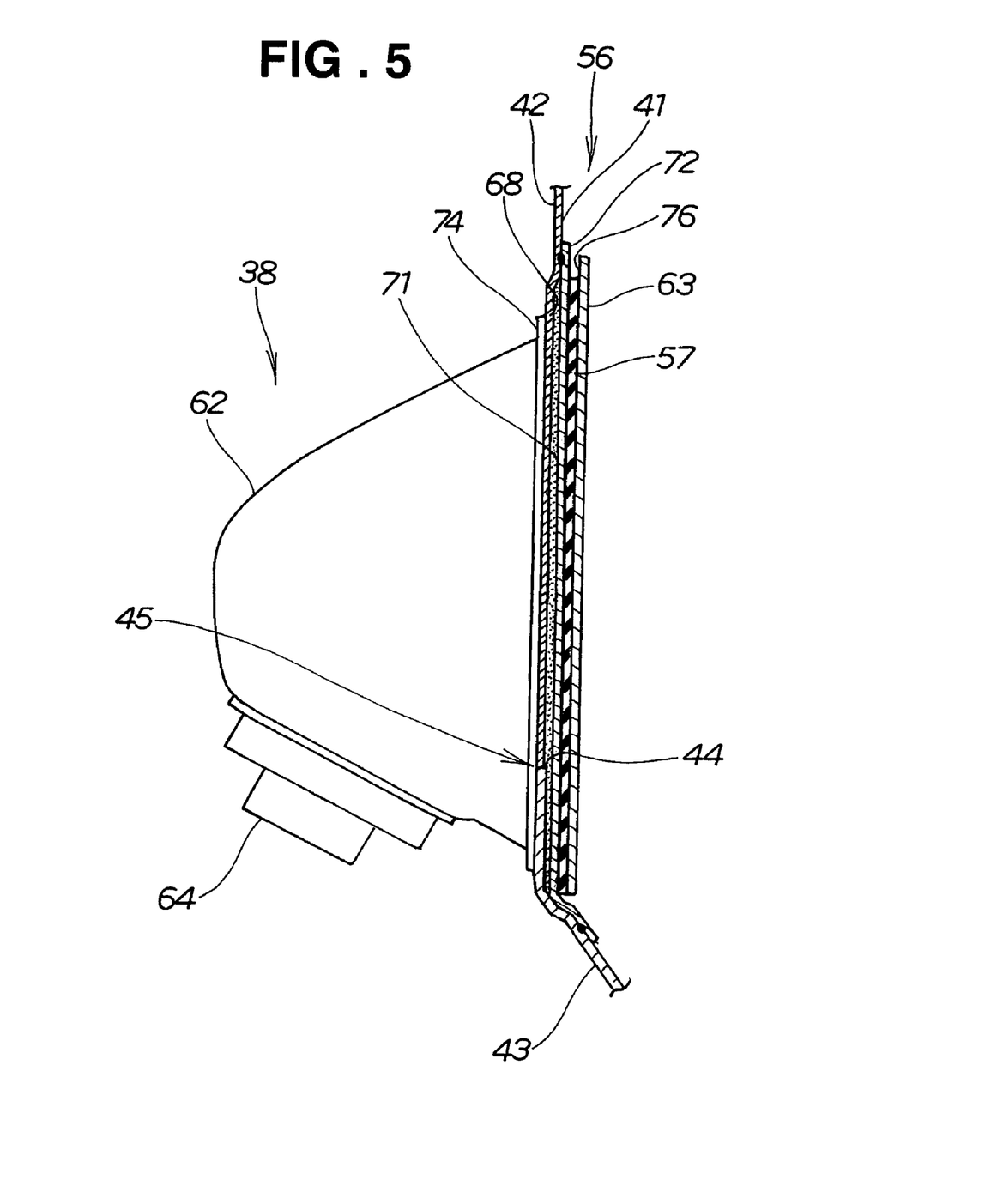
FIG. 5 is a cross-sectional view taken along line V—V of FIG. 3.

As shown in FIG. 3, the dashboard 35 is formed from a tailored blank 41 consisting of two metal plates 42, 43 with different thicknesses t1, t2 butt-welded together to form a stepped portion or step 44 at one side (passenger compartment side) thereof. The dashboard 35 is thus a tailored blank article. The dashboard (tailored blank article) 35 has an opening 46 (best shown in FIG. 7) formed therein and extending over the two metal plates 42, 43 across the step 44. The thickness t1 of the upper (first) metal plate 42 is smaller than the thickness t2 of the lower (second) metal plate 43.

Figure 6:
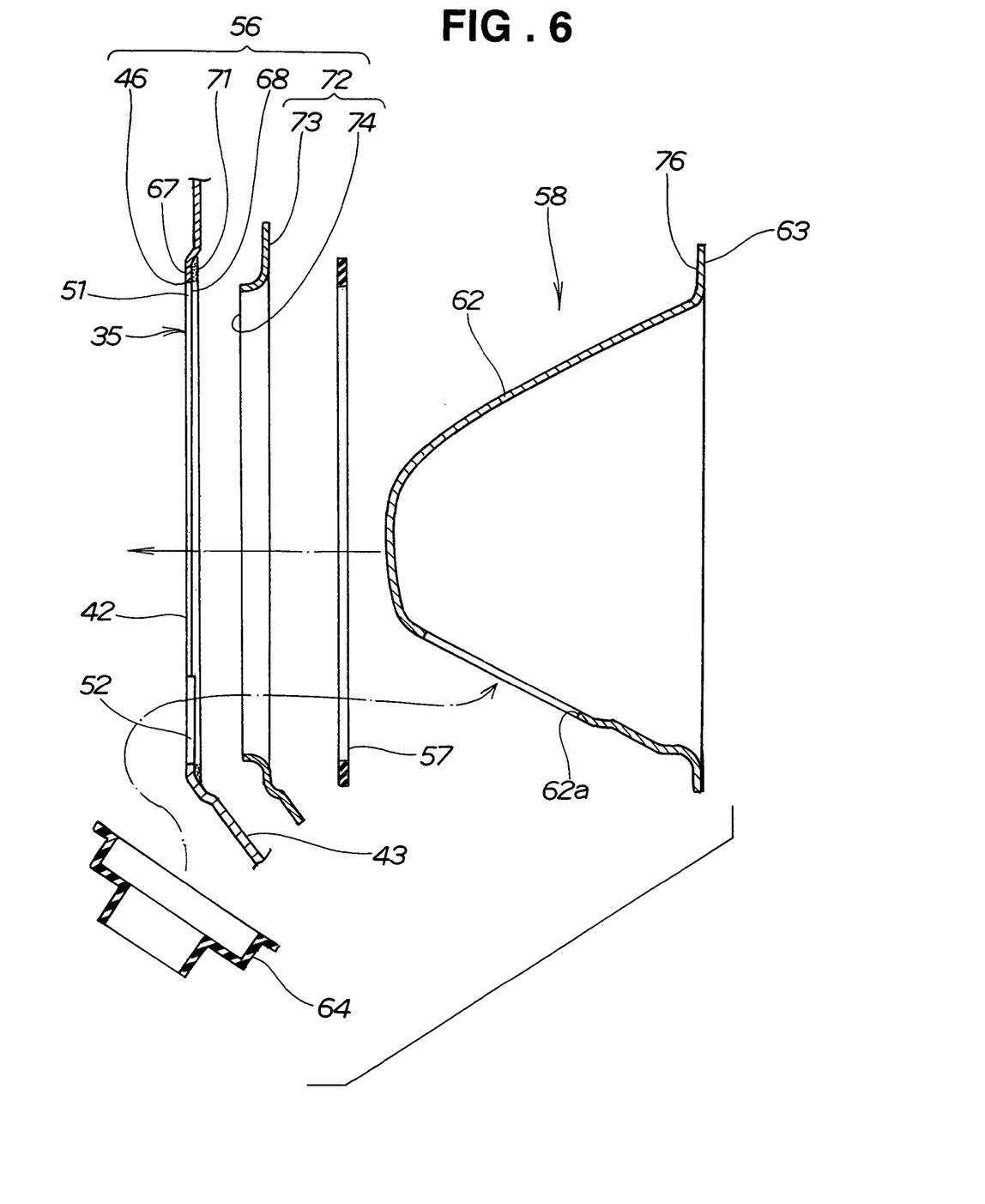
FIG. 6 is an exploded cross-sectional view of a lead-in port assembly in which the lead-in opening structure is incorporated.

The opening 46 may be formed either before or after the two metal plates 42, 43 are welded together into a tailored blank. In the former case, the metal plates 42, 43 each have a cut-out portion 51, 52 (FIGS. 6 and 7) at one side thereof, and when they are welded together, the cut-out portions are held in confrontation with each other.

The step 44 of the dashboard 35 extends along a butt-joint 45 between the upper metal plate 42 and the lower metal plate 43. The butt-joint may be formed by butt-welding or laser-welding.

As shown in FIGS. 3 to 6 the lead-in port assembly 38 generally comprises a lead-in opening structure 56 including the opening 46, a seal ring 57 of an elastic material disposed on the lead-in opening structure 56, and a cup-shaped lead-in member 58 mounted to the lead-in opening structure 56 with the elastic seal ring 57 disposed in a compressed state between the lead-in opening structure 56 and the cup-shaped lead-in member 58. Numeral 61 denotes mounting pins provided on an inner surface (facing the passenger compartment) of the dashboard 35 for attachment of the cup-shaped lead-in member 58 to the dashboard 35. The cup-shaped lead-in member 58 includes a generally cup-shaped body 62 press-formed from a steel sheet and having an annular flange at an open end thereof, and a rubber boot 64 attached to a sidewall of the body 62 for sealing and guiding a part of a lead-in element (indicated by phantom line shown in FIG. 4) that is introduced from the engine room side into the cup-shaped body 62 through an opening 62a formed in the sidewall of the cup-shaped body 62. The lead-in element 65 is then introduced into the passenger compartment 13.

Figure 7:
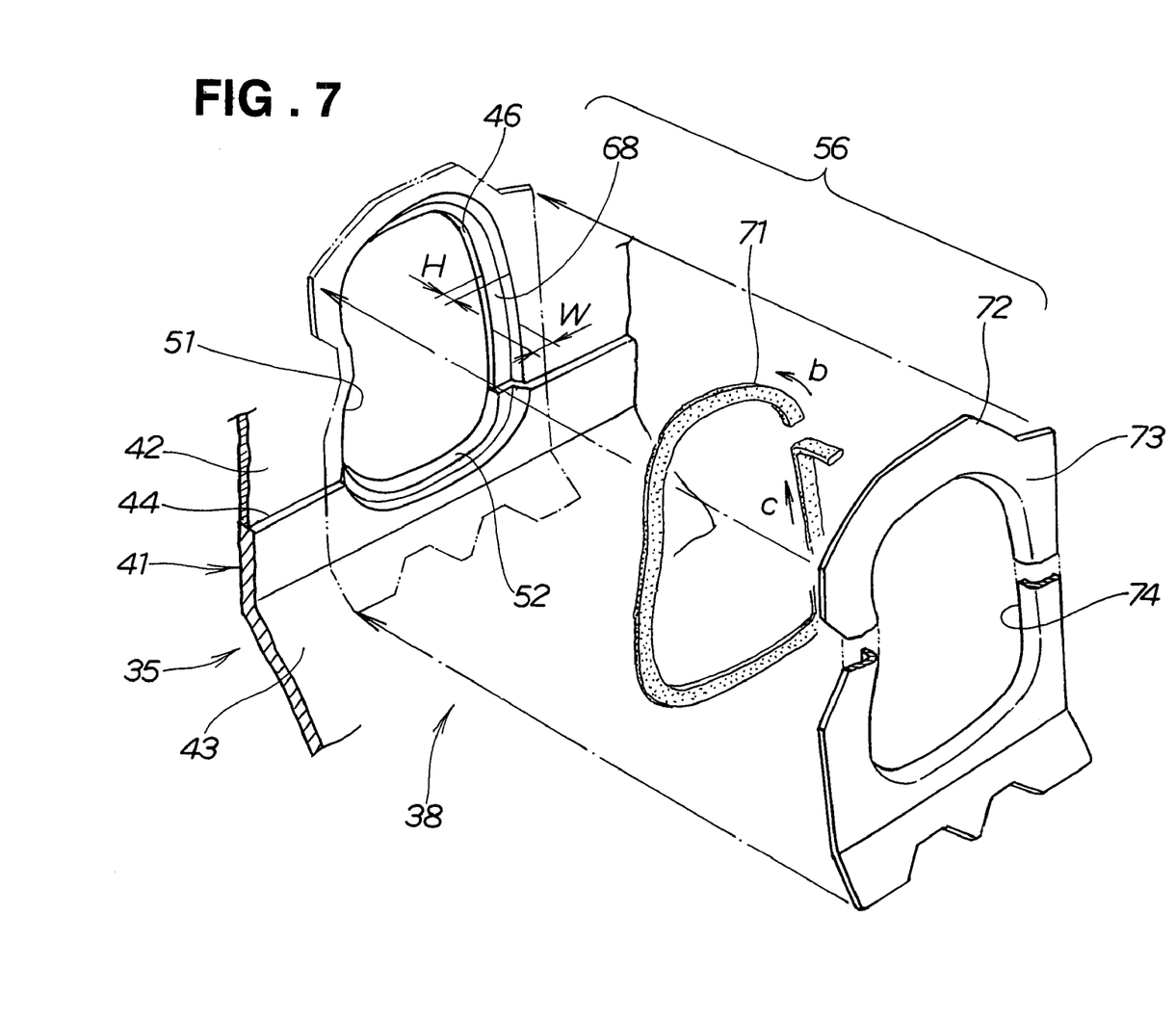
FIG. 7 is an exploded perspective view of the lead-in opening structure.

As best shown in FIG. 7, the lead-in opening structure 56 includes the opening 46 formed in the dashboard 35 in the manner described above, a recessed portion 68 formed in the inner surface of the dashboard 35 along a peripheral edge 46 of the opening 46, a sealing material 71 filled in the recessed portion 68, and a generally ring-like seal plate 72 covering the sealing material 71 and mounted to the dashboard 35. The recessed portion 48 has a width W and a depth H that are uniform throughout the periphery of the opening 46. The amount of sealing material 71 filled in the recessed portion 48 is determined such that an upper surface of the sealing material 71 is at least flush with, and preferably projects from, an upper surface of the step 44. The sealing material 71 may be filled in the recessed portion 48 by means of a suitable seal application device or applicator (not shown) operated to move in a direction indicated by the arrows b and c. The seal plate 72 is formed from a steel plate into a configuration corresponding in contour to the shape of the opening 46. The seal plate 72 has a flat seat portion 73 extending over the seal member 71 and a tubular lip 74 fitted with the peripheral edge 46 of the opening 46. The flat seat portion 73 forms an end flange of the tubular lip 74.

In assembly of the lead-in opening structure 56, the dashboard 35 is disposed horizontally with the recessed portion 68 of the opening 46 facing upward. Then the sealing material 71 is filled in the recessed portion 68 until an upper surface of the sealing material 71 is at least flush with, and preferably projects from, an upper surface of the step 44. Subsequently, the seal plate 72 is placed over the sealing material 71 with the tubular lip 72 thereof fitted with the peripheral edge 67 of the opening 46. Finally, the seal plate 72 is spot-welded to the dashboard 35 as at 75 (FIG. 4) with the sealing material 71 is disposed, preferably in a compressed state, between the recessed portion 68 and the flat seat portion (end flange) 72 of the seal plate 72. Even though the presence of the step 44 in the dashboard (tailored blank article) 35, the lead-in opening structure 56 thus assembled is made watertight and provides a flat seat portion 73, which is particularly advantageous for easy and stable attachment of the cup-shaped lead-in member 58 to the dashboard 35. The flat seat portion 73 preferably has a predetermined degree of surface roughness for the purpose of providing a certain gripping force relative to the sealing material 71 and the seal ring 57 when it is brought into contact with or forced against the sealing material 71 and the seal ring 57.

Figure 8:
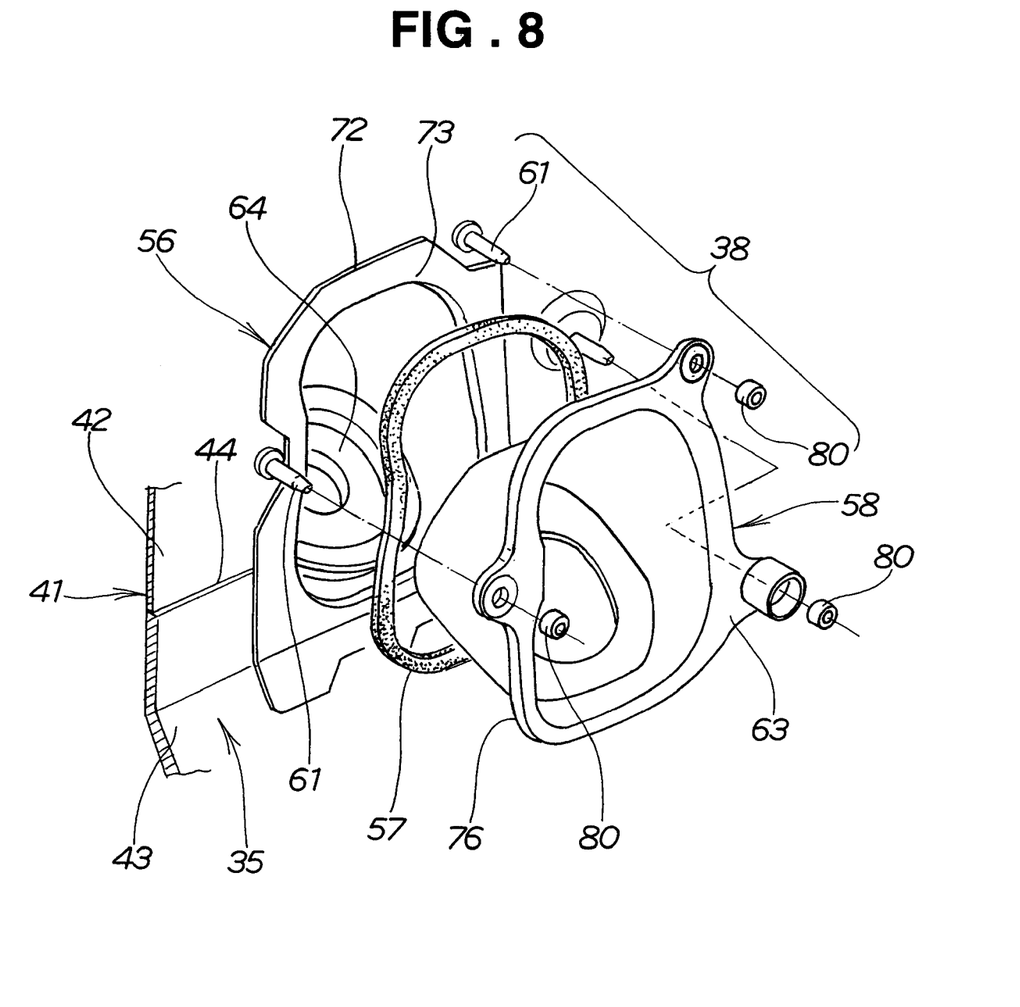
FIG. 8 is an exploded perspective view showing the manner in which a flanged cup-shaped lead-in member is assembled with the lead-in opening structure of the present invention.

Subsequently, as shown in FIG. 8, the cup-shaped lead-in member 58 is fitted into the lead-in opening structure 56 with the seal ring 57 disposed between the flat seat portion 73 of the seal plate 72 and a rear surface 76 of the flange 63 of the body 62 of the cup-shaped lead-in member 58, and the cup-shaped lead-in member 58 is attached to the dashboard 35 by means of the mounting pins 61 and sleeves 80 press-fitted with the respective mounting pins 61 with portions of the flange 63 firmly cramped therebetween. The thus assembled lead-in opening structure 56 and cup-shaped lead-in member 58 together form the lead-in port assembly 38.

As thus far described, the dashboard (tailored blank article) 35 has a lead-in opening structure 56 for introducing a lead-in element 65 (FIG. 4) from an engine room side to a passenger room side of the dashboard 35. The lead-in opening structure 56 includes an opening 46 formed in the dashboard 35 so as to extend over two metal plates 42, 43 with different thicknesses across a step 44 formed on one surface of the dashboard 35 along a butt-joint 45 between the two metal plates 42, 43. The lead-in opening structure 56 further includes a recessed portion 68 formed in the one surface of the dashboard 35 along a peripheral edge 67 of the opening 46, a sealing material 71 filled in the recessed portion 68 to undergo leveling of the peripheral edge 67 of the opening 46 including the step 44, and a seal plate 72 of a configuration corresponding in contour to the shape of the opening 46, covering the sealing material 71, and being attached to the dashboard 35.

Since the peripheral edge 67 of the opening 46 including the step 44 is leveled by the sealing material 71 filled in the recessed portion 68 formed in the stepped surface of the dashboard 35 along the peripheral edge 67, it is possible to attach the seal plate 72 to the dashboard 35 with increased stability. Furthermore, the sealing material 71 disposed between the recessed portion 68 of the dashboard 35 and the seal plate 72 makes the lead-in opening structure 56 watertight. By thus providing the watertight lead-in opening structure 56, leakage of water or other liquid from the engine room side to the passenger compartment side does never occur during washing of the engine room 16.

Furthermore, the flat seat portion 73 of the seal plate 72 facilitates easy and stable assembly of the cup-shaped lead-in member 58 relative to the lead-in opening structure 56 with the seal ring 57 held between the flat seat portion 73 and an end flange 76 of the cup-shaped lead-in member 58. The seal ring 57 improves the water-tightness of a lead-in port assembly 38 formed jointly by the lead-in opening structure 56 and the cup-shaped lead-in member 58.

Obviously, various minor changes and modifications are possible in the light of the above teaching. It is to be understood that within the scope of the appended claims the present invention may be practiced otherwise than as specifically described.

What is claimed is:

1. A tailored blank article comprising:
   two metal plates with different thicknesses butt-welded together to form a step on one surface of the tailored blank article along a butt-joint between the two metal plates; and
   a lead-in opening structure for introducing a lead-in element from one side to the other side of the tailored blank article, the lead-in opening structure including
      an opening formed in the tailored blank article so as to extend over the two metal plates across the step,
      a recessed portion formed in the one surface of the tailored blank article along a peripheral edge of the opening,
      a sealing material filled in the recessed portion to undergo leveling of the peripheral edge of the opening including the step, and
      a seal plate of a configuration generally corresponding in contour to the shape of the opening, the seal plate covering the sealing material and being attached to the two metal plates.

2. The tailored blank article according to claim 1, wherein the seal plate has a tubular lip fitted with the peripheral edge of the opening, and a flat seat portion integral with the tubular lip and forming an end flange of the tubular lip, the flat seat portion extending over the sealing material and being attached to the two metal plates.

3. The tailored blank article according to claim 2, further comprising: a seal ring and a generally cup-shaped lead-in member having an end flange at an open end thereof, the cup-shaped lead-in member being assembled with the lead-in opening structure with the seal ring disposed between the flat seat portion of the seal plate and the end flange of the cup-shaped lead-in member.

* * * * *